United States Patent
Miyata et al.

(12)

(10) Patent No.: US 6,291,737 B1
(45) Date of Patent: *Sep. 18, 2001

(54) METHOD OF DECOMPOSING DIOXINS

(75) Inventors: Hiroshi Miyata; Naoaki Fujiyoshi; Hirofumi Izumikawa; Mitsuhiro Mashiko; Noboru Fujiwara, all of Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/475,272

(22) Filed: Dec. 30, 1999

Related U.S. Application Data

(63) Continuation of application No. 09/155,157, filed on Sep. 22, 1998, now Pat. No. 6,063,979.

(30) Foreign Application Priority Data

Nov. 21, 1997 (JP) ................................... 9-321357

(51) Int. Cl.⁷ ....................................................... A62D 3/00
(52) U.S. Cl. ........................... 588/205; 588/207; 588/209
(58) Field of Search .................................. 588/205, 206, 588/207, 209; 423/210, 240 S, 240 R, 245.1; 110/345; 55/487, 523, 525

(56) References Cited

U.S. PATENT DOCUMENTS

| 5,113,772 | * | 5/1992 | Karasek et al. ........................ 110/345 |
| 5,925,156 | * | 7/1999 | Motoki et al. .......................... 55/487 |
| 6,063,979 | * | 5/2000 | Miyata et al. ......................... 588/205 |

FOREIGN PATENT DOCUMENTS

| 574705 | * | 5/1993 | (EP) .............................. B01D/53/34 |

* cited by examiner

*Primary Examiner*—Steven P. Griffin
*Assistant Examiner*—Eileen E. Nave
(74) *Attorney, Agent, or Firm*—Kanesaka & Takeuchi

(57) ABSTRACT

A method for decomposing and eliminating dioxins contained in flyash at a lower temperature and in a shorter time is provided, in which dioxides or dioxins-containing materials are brought into contact with amine compounds and/or ammonium compounds at a temperature lower than 300 ° C. Chlorine in dioxines reacts with amine compounds and/or ammonium compounds and thus the dechlorination or replacement reaction of dioxin quickly proceeds under lower temperature. The method makes it possible to decompose dioxins under low temperature range in which dioxins have been thought to be undecomposable.

7 Claims, No Drawings

METHOD OF DECOMPOSING DIOXINS

CROSS REFERENCE TO RELATED APPLICATION

This is a continuation application of patent application Ser. No. 09/155,157 filed on Sep. 22, 1998, now U.S. Pat. No. 6,063,979.

TECHNICAL FIELD

This invention relates to a method for decomposing dioxins, and more particularly, to a method for effectively decomposing polychloro-p-dibenzodioxins (PCDD) and polychlorodibenzofurans (these compounds are hereinafter referred to as "dioxins") contained in flyash and bottom ashes (these materials are hereinafter referred to as "incineration ashes") discharged from various incineration plants such as an incineration plant for municipal solid waste, industrial waste and/or medical waste.

BACKGROUND OF THE INVENTION

In the incineration plants such as incineration plants for municipal solid waste, industrial waste and/or medical waste, the dioxides precursors including organic compounds such as phenols, benzene and acetylene, and chlorinated aromatic compounds such as chlorophenols and chlorobenzenes are formed during incineration. When flyash coexists in these precursors, the precursors change to dioxides under the catalytic action of flyash, and thus generated dioxins exist in incineration ashes.

Conventionally proposed methods for treating such dioxides-containing flyash are as follows. (1) To keep the dioxides-containing flash for 1–2 hours at a temperature between 320 and 400° C. under a reductive atmosphere (for instance, 2 hours at 320° C. or 1–1.5 hours at 340° C.) (Hagenmaier process, "ORGANOHALOGEN COMPOUNDS Vol. 27 (1996)" p. 147–152)

(2) A heat treatment of the dioxins-containing flash at 300–500° C. under the existence of a dioxins formation inhibitor (JPA 4-241880). It has been said that dioxins do not heat-decompose at a temperature lower than 300° C. This method is basically in accordance with the above mentioned theory, decomposing dioxins at above 300° C., and a dioxins formation inhibitor is added to the flash in order to prevent the formation of dioxins during the heat treatment in a temperature range in which dioxins decompose. For particulars, flyash is heated at 400° C. for 2 hours under the existence of pyridine vapor as the dioxins formation inhibitor.

The aforementioned conventional methods have a drawback in that their high treatment temperature and long treatment time require much energy and high cost. Especially, in the above mentioned method (1) it is required to perform the treatment under a reductive atmosphere such as nitrogen gas, bringing about complexity and a high cost.

DISCLOSURE OF THE INVENTION

The object of the present invention is to solve the problems of the prior art and to provide a method which makes it possible to decompose and eliminate the dioxins under a low temperature region in which dioxides have been thought not to decompose, and to perform the treatment even under the existence of oxygen.

According to the method of the present invention for decomposing dioxins, dioxins are decomposed by bringing dioxides or dioxides-containing materials into contact with at least one treating chemical selected from the group consisting of amine compounds and ammonium compounds at a temperature lower than 300° C.

According to the present invention, chlorines in dioxides react with the amine compound and/or the ammonium compound and this reaction causes quick dechlorination or replacement of chlorine atoms of dioxides and eventually, the detoxifications of dioxides at a temperature below 300° C., at which dioxides have been thought usually undecomposable.

Such effect of the amine compound and/or ammonium compound to decompose dioxins at a temperature below 300° C. has been hitherto unknown.

PREFERRED EMBODIMENT OF THE INVENTION

Dioxins to be treated according to the present invention may be contained in the exhaust gas discharged from various incineration plants such as municipal solid waste incineration plants, industrial wastes incineration plants, medical waste incineration plants and so on. The dioxins-containing materials are such as incineration ash which has dioxins adsorbed thereon, activated carbon powder used in the adsorption treatment of dioxins, and soil contaminated with dioxins.

The amine compound as the treating chemical may be at least one of alkanolamines such as monoethanolamine, diethanolamine, triethanolamin, methanolamine, and aminomethylpropanol, lower alkyl-derived amines such as diethylamine, propylamine, and ethylenediamine, and cyclic amines such as aniline. The preferred compounds among above mentioned are triethanolamine, diethanolamine, monoethanolamine, aniline, propylamine, ethylendiamine, and aminomethylpropanol.

The ammonium compound as the treating chemical may be at least one of ammonia, urea, and ammonium salts such as ammonium bicarbonate, ammonium carbonate, ammonium hydroxide, ammonium acetate. ammonium sulfate, ammonium phosphate, and ammonium hydrogen phosphate. The preferred compounds among above mentioned are ammonia, urea, ammonium bicarbonate, ammonium sulfate, and ammonium hydrogen phosphate, and the most preferred compound is ammonia.

When at least one treating material of the amine compounds and the ammonium compounds is brought into contact with the incineration ashes to decompose the dioxines, it is preferred that the treating chemical is added to the reaction system in a ratio of 0.1–10% by weight and especially 1–5% by weight to the amount of incineration ashes. The chemical is preferable to be added in a larger amount as the reaction temperature is lower.

The amine compounds and/or ammonium compounds to be added to the reaction system may be in the state of either gas, liquid, or aqueous solution. As the dioxins and the dioxins-containing materials are effectively decomposed when they are brought into contact with at least one of the gaseous amine compounds and the ammonium compounds, it is preferred that the amine compounds and the ammonium compounds have a sufficiently high vapor pressure at a temperature lower than 300° C.

In case that the liquid or the aqueous solution of the treating material is sprayed into the exhaust gas, or in case the material is preliminarily mixed with the incineration ashes, the material is preferable to have a vapor pressure that they are fully vaporized at a temperature lower than 300° C.

As to the method in which at least one of the amine compounds and the ammonium compounds is brought into contact with the dioxin-containing materials to be treated, either of the following methods A, B and C can be employed in case of the dioxin-containing materials are soil or incineration ashes.

A: The dioxins-containing materials and the amine compounds and/or ammonium compounds are mixed so that they are brought into contact at an ambient temperature. Otherwise, the mixture is heated to a temperature lower than 300° C. to gasify the amine compounds and/or ammonium compounds so that the amine compounds and/or ammonium compounds in gaseous form are brought into contact with dioxins. In these cases, it is preferable to previously dissolve the amine compounds and/or ammonium compounds into water or other solvents.

B: The amine compounds and/or ammonium compounds are heated to gasify at a temperature lower than 300° C., and a gas flow containing this resultant gas is brought into contact with the dioxins-containing materials.

C: The amine compounds and/or ammonium compounds are applied to a solid material and then, this solid material is mixed with, or placed on the dioxins-containing materials. After that, they are heated to a temperature lower than 300° C. In this case, preferably a gas flow is passed through the reaction system.

In a case dioxins or dioxins-containing materials exist in gaseous form or as floating small particles in a gas flow such as incineration exhaust gas, the following methods D, E, and F, for example, can be employed.

D: Vapor of the amine compounds and/or ammonium compounds or a gas containing this vapor is supplied into the above mentioned gas flow.

E: The amine compounds and/or ammonium compounds in liquid form are supplied into the gas flow in mist or in liquid drops.

F: A solution containing amine compounds and/or ammonium compounds dissolved in it is supplied into the gas flow in mist or in liquid drops.

In an incineration system in which a dust collector to remove flyash in the exhaust gas is equipped, it is preferable to supply the amine compounds and/or ammonium compounds in a gas, liquid, or solution state into the exhaust duct before the dust collector or into the dust collector itself. Typically, the gas temperature at the inlet of an electrostatic precipitator is in a range from 200 to 300° C., and gas temperature at the inlet of bag filter is in a range form 140 to 230° C. Accordingly, it is preferable that the amine compounds and/or ammonium compounds to be supplied into the dust collector or into the duct upstream thereof has a sufficiently high vapor pressure in a temperature range from 140 to 230° C.

Usually, dioxins do not decompose at a temperature lower than 300° C. According to the present invention, the temperature at which dioxins and the dioxins-containing materials are brought into contact with amine compounds and/or ammonium compounds is lower than 300° C. Nevertheless, the reaction between chlorines in dioxins and the amine compounds and/or ammonium compounds causes the dechlorination reaction or replacement reaction leading to the detoxification of dioxins. The lowest temperature during the contact is determined by the vapor pressure or the ease of vaporization of the amine compounds and/or ammonium compounds. Namely, the preferred temperatures at which the contact is made are: ambient temperature for monoethanolamine, over 150° C. for diethanolamine, and over 200° C. for triethanolamine, aniline, n-propylamine, ethylenediamine, and aminomethylpropanol. When the amine compounds and/or ammonium compounds are brought into contact with the dioxins or dioxins-containing materials at a temperature over 200° C., dioxins are generally decomposed with a sufficiently high decomposition ratio. Besides, ammonia gives a sufficiently high decomposition ratio at over ambient temperature. Little or no improvement in the decomposition ratio is obtained by using contact temperature higher than 300° C.

The longer the time of the contact between amine compounds and/or ammonium compounds and materials to be treated, the higher the decomposition ratio of dioxins, but too long a contact time makes the treatment cost too high. According to the method of the present invention, a sufficiently high decomposition ratio can be obtained with the contact time of typically 3–60 minutes, especially 4–40 minutes and particularly 5–30 minutes. It is preferable that the lower the temperature during the contact, the longer the contact time. For example, if the contact is made at ambient temperature, a contact time of 20–40 minutes is preferable.

The contact between the amine compounds and/or ammonium compounds and the dioxins or dioxins-containing materials can give a sufficiently high decomposition ratio even when the contact is made in a reductive atmosphere or in the presence of oxygen, i.e. in the open air or in the exhaust duct. Consequently, when carrying out the method of the present invention, the devices and the operations for the conditioning of atmosphere are generally not necessary.

However, when the amine compounds and/or ammonium compounds are brought into contact with dioxides or dioxides-containing materials, attention must be paid against the explosion hazard, if the compound used has a flash point which is lower than the temperature during the contact. If the concentration of the compound in concern in the atmosphere in which the contact is made is lower than the explosion limit, the explosion can effectively be avoided. Therefore, to lower the oxygen concentration in the atmosphere is effective for the prevention of the explosion. Examples of such precaution include to supply to the atmosphere a gas containing little or no oxygen, such as nitrogen, carbon dioxide, water vapor, and combustion exhaust gas. Severer precautions must be taken if the compound is supplied into the exhaust duct or into the dust collector. To introduce a part of the combustion exhaust discharged from the dust collector to the exhaust duct using a fan or the like is a preferable method because it is a low cost method to effectively lower the oxygen concentration in the flue gas flowing in the exhaust duct.

In treating the incineration ashes according to the method of the present invention, an immobilization treatment of the heavy metals in the ashes may be performed at the same time as the decomposition of the dioxides, using a chelating agent or a heavy metal immobilization chemicals such as phosphoric acid.

The ashes to be treated may include the activated carbon powder which has been blown into the exhaust duct of the incineration plant in order to remove dioxins from the incineration flue gas.

The incineration ashes and soil which have been treated according to the method of the present invention may be, either as it is or after having received the further treatment such as heavy metal immobilization, kept in drums or used as land fill.

Hereinafter, the present invention will be described in more with reference to examples and comparative examples.

EXAMPLES 1 through 4

Comparative Example 2

A triethanolamine aqueous solution of which concentration is 5% by weight is added to 10 grams of flash discharged and collected from a municipal solid waste incinerator in such a manner as to make the proportion of triethanolamine to the flyash to be 5% by weight. The mixture was thoroughly mixed and then heated for 10 minutes at the temperatures specified in Table 1, respectively.

After that, the dioxins concentrations of the treatment products were measured to give the results shown in Table 1.

Comparative Examples 1, 3 through 6

Except that water was added to the flyash instead of triethanolamine solution and the mixture was heated to temperatures specified in Table 1, identical treatment was carried out and dioxins concentrations of the resultant products were measured to give the results shown in Table 1.

Moreover, the decomposition ratios in Examples 1 through 4 were calculated according to the following equation, from the results of Examples 1 through 4 and Comparative Examples 3 through 6 in which the treatment was made at identical temperatures with the examples but without the addition of triethanolamine. The values of these calculations are also shown in Table 1.

addition when the treatment is performed at 180° C. at which triethanolamine does not vaporize.

Example 5

A glass column having a size of 20 mm φ×250 mm was filled with 3 g of flyash discharged and collected from a municipal solid waste incinerator. The flash column was then topped with glass beads on which 150 mg of monoethanolamine had been applied. The column was heated to the temperatures of ambient temperature (20° C.), 50° C., 100° C., 150° C., 180° C., 200° C., 220° C., 250° C. and 290° C., respectively, for 20 minutes while passing air flow through the column at a rate of 15 ml/minute from the glass beads side.

Afterward, the dioxins concentrations of the treated products were measured with the results shown in Table 2.

EXAMPLES 6, 7

Instead of monoethanolamine in the Examples 1–5, diethanolamine was used in Example 6, and triethanolamine in Example 7. For the other respects, the experiment was

TABLE 1

$$\text{Decomposition ratios of dioxins (\%)} = \frac{\begin{pmatrix} \text{Dioxins concentrations of} \\ \text{Comparative Examples} \\ \text{at identical temperatures} \end{pmatrix} - \begin{pmatrix} \text{Dioxins concentrations in} \\ \text{Examples at identical} \\ \text{temperatures} \end{pmatrix}}{\text{(Dioxins concentrations in Comparative Examples)}} \times 100$$

| Example | Treatment Temperature | Triethanolamine Addition | Dioxins Concentration in Treatment Products (ng/g-flyash) | Dioxins Decomposition Ratio(%) |
|---|---|---|---|---|
| Comperative Example 1 | 180 | none | 1885 | 0 |
| Comperative Example 2 | 180 | added | 2303 | — |
| Comperative Example 3 | 200 | none | 2142 | 0 |
| Example 1 | 200 | added | 726 | 66.1 |
| Comperative Example 4 | 220 | none | 2535 | 0 |
| Example 2 | 220 | added | 314 | 87.6 |
| Comperative Example 5 | 250 | none | 2614 | 0 |
| Example 3 | 250 | added | 6.5 | 99.8 |
| Comperative Example 6 | 290 | none | 2655 | 0 |
| Example 4 | 290 | added | 6.0 | 99.8 |

As apparent from Table 1, by adding triethanolamine to flash followed by heating to temperatures from 200 to 290° C., dioxides are decomposed in high decomposition rates. Especially, when the treatment was performed at a temperature between 250° C. and 290° C., more than 99% of dioxides present in the materials are decomposed.

Meanwhile, as it is evident from Comparative Example 2, dioxins does not decompose in spite of triethanolamine carried out in the same manner as in Example 5. The measured values of dioxins concentrations are shown in Table 2.

Comparative Example 7

Except that nothing was applied on the glass beads, the experiment was carried out in the same manner as in Example 5.

The dioxins residual ratio was calculated according to the following equation from the results of Examples 5 through 7 and Comparative Example 7. The results are shown in Table 2.

TABLE 2

$$\text{Dioxins residual ratio (\%)} = \frac{\text{(Dioxins concentration in the treatment in concern)}}{\begin{pmatrix}\text{Dioxins concentrations in the treatment at ambient} \\ \text{temperature and without amine compound} \\ \text{(1335 ng/g)}\end{pmatrix}} \times 100$$

Dioxins Concentration (ng/g) (residual ratio(%) in the parentheses)

| | Examples and Comperative Examples | | | |
|---|---|---|---|---|
| | Example | | | Comperative |
| | 5 | 6 | 7 | Example 7 |
| | Kinds of Amine Compounds | | | |
| | Monoethanolamine | Diethanolamine | Triethanolamine | — |
| Treatment temperature (° C.) | | | | |
| Ambient temperature (20) | 800 (60.1) | 1337 (100) | 1335 (100) | — |
| 50 | 170 (13.0) | 1337 (100) | 1334 (99.9) | 1335 (100) |
| 100 | 120 (9.0) | 1328 (99.5) | — | 1340 (100) |
| 150 | 97 (7.3) | 245 (18.4) | — | 1510 (113) |
| 180 | 54 (4.0) | 178 (13.3) | 1912 (143) | 1885 (141) |
| 200 | 90 (6.7) | 100 (7.5) | 726 (54.4) | 2142 (160) |
| 220 | 48 (3.6) | 93 (7.0) | 314 (23.5) | 2530 (190) |
| 250 | 39 (2.9) | 50 (3.7) | 6.5 (0.5) | 2614 (196) |
| 290 | — | — | 6.0 (0.4) | 2665 (200) |

As apparent from Table 2, in Comparative Example 7 in which no amine compound was used, heating of flash increases the dioxins concentration showing that in this temperature range, only the generation of dioxides occurs and decomposition reaction does not. On the other hand, in the Examples 5 through 7 where different amine compounds were brought into contact with flyash, dioxins are effectively decomposed. It is also shown that the lower limit of temperature for decomposition is different by amine compounds. Namely, monoethanolamine shows a decomposition ratio of over 90% at 100° C., and 80% even at 50° C., while diethanolamine and triethanolamine give high decomposition ratios at over 150° C. and over 200° C., respectively.

EXAMPLES 8, 9, 10, 11

Experiments were carried out in the same mariner as Example 5 except that aniline, n-propylamine, ethylenediamine, and aninomethylpropanol were used as amine compounds in Examples 8, 9, 10, and 11, respectively, and that the treatment temperatures set at 250° C. Residual concentrations and decomposition ratios of dioxins are shown in Table 3.

EXAMPLE 12

An experiment was carried out in the same manner as Example 5 except that aqueous solution of ammonia was used instead of monoethanolamine and treatment temperature was set at 250° C. Residual concentrations and decomposition ratios of dioxins shown in Table 3. The application quantity of ammonia ($NH_3$) on glass beads was 150 mg.

TABLE 3

Residual Concentrations and Decomposition Ratios of Dioxins (treatment temperature 250° C.)

| Examples | Compound | Residual concentration (ng/g) | decomposition ratio |
|---|---|---|---|
| 8 | aniline | 210 | 84.2% |
| 9 | n-propylamine | 350 | 73.8% |
| 10 | ethylenediamine | 100 | 92.5% |
| 11 | aminomethylpropanol | 300 | 77.5% |
| 12 | ammonia | 810 | 39.3% |

It is evident from Table 3 that the amine compounds used in Examples 8 through 12 also give a high decomposition ratio of dioxins.

INDUSTRIAL APPLICABILITY

As described in detail in the above, according to the method of the present invention for the decomposition of dioxins, dioxins are decomposed and eliminated in a short time, and in a low temperature range in which usually dioxins decomposition does not occur. This brings about a decrease in the energy cost required for the treatment and improvement in the effectiveness of the treatment, resulting in the considerable decrease in the total cost of the treatment. Moreover, since the method of the present invention does not require a reductive treatment atmosphere so that the treatment can be performed in the open air or in the flue gas, the method can be conducted with simple treatment equipment and easy operation.

What is claimed is:

1. A method for decomposing dioxins or dioxins-containing materials consisting essentially of:
   supplying at least one treating chemical selected from the group consisting of monoethanolamine, diethanolamine, triethanolamine, aniline, n-propylamine, ethylenediamine and aminomethylpropanol in an exhaust duct, and contacting a gaseous flow containing dioxides in the exhaust duct with said at least one treating chemical at a temperature lower than 300° C. so that dioxins contained in the gaseous flow are decomposed, monoethanolamine being contacted with the gaseous flow over an ambient temperature, diethanolamine being contacted with the gaseous flow over 150° C., and triethanolamine, aniline, n-propylamine, ethylenediamine and aminomethylpropanol being contacted with the gaseous flow over 200° C.

2. A method for decomposing dioxins as claimed in claim 1 wherein the exhaust duct has a dust collector, and said at least one treating chemical is supplied into the exhaust duct or the dust collector.

3. A method for decomposing dioxins as claimed in claim 1, wherein said at least one treating chemical is supplied in a gaseous state.

4. A method for decomposing dioxins as claimed in claim 1, wherein said at least one treating chemical is liquid and is supplied in a liquid state including mists and liquid drops.

5. A method for decomposing dioxins as claimed in claim 1, wherein a solution of said at least one treating chemical is supplied in a liquid state including mists and liquid drops.

6. A method for decomposing dioxins as claimed in claim 1, wherein said at least one treating chemical is contacted with the gaseous flow between 3 and 60 minutes.

7. A method for decomposing dioxins as claimed in claim 6, wherein said at least one treating chemical is contacted with the gaseous flow in a temperature range from 140 to 230° C.

* * * * *